United States Patent
Barrientos et al.

(10) Patent No.: US 7,971,827 B2
(45) Date of Patent: Jul. 5, 2011

(54) BIRD COLLISION PREVENTION DEVICE FOR AN AIRCRAFT

(76) Inventors: Ernesto D. Barrientos, Katy, TX (US); Ernesto Barrientos Y Mata, Tlalneplantla (MX)

( * ) Notice: Subject to any disclaimer, the term of this patent is extended or adjusted under 35 U.S.C. 154(b) by 181 days.

(21) Appl. No.: 12/430,560

(22) Filed: Apr. 27, 2009

(65) Prior Publication Data

US 2010/0270427 A1   Oct. 28, 2010

(51) Int. Cl.
    *B64C 1/10* (2006.01)
(52) U.S. Cl. .................................................... 244/121
(58) Field of Classification Search ............... 244/121
    See application file for complete search history.

(56) References Cited

U.S. PATENT DOCUMENTS

| | | | | |
|---|---|---|---|---|
| 1,104,866 A | * | 7/1914 | Berry | 52/182 |
| 1,123,491 A | * | 1/1915 | Corbin | 290/54 |
| 1,900,315 A | * | 3/1933 | Valiquette | 180/182 |
| 2,699,303 A | * | 1/1955 | Chilman | 244/134 D |
| 2,944,631 A | * | 7/1960 | Kerry et al. | 55/306 |
| 3,196,598 A | * | 7/1965 | Olson | 55/306 |
| 3,405,887 A | * | 10/1968 | Mixson | 244/158.9 |
| 4,149,689 A | * | 4/1979 | McDonald | 244/53 B |
| 4,275,859 A | * | 6/1981 | Bleday | 244/121 |
| 4,751,135 A | * | 6/1988 | Fenton | 428/188 |
| 4,765,576 A | * | 8/1988 | Peled | 248/49 |
| 4,833,879 A | * | 5/1989 | Verduyn et al. | 60/39.092 |
| 5,411,224 A | * | 5/1995 | Dearman et al. | 244/53 B |
| D433,029 S | * | 10/2000 | Eidson | D12/345 |
| 6,213,718 B1 | * | 4/2001 | Hill et al. | 416/146 R |
| 6,250,255 B1 | | 6/2001 | Lenhardt et al. | |
| 6,940,424 B2 | * | 9/2005 | Philiben et al. | 340/945 |
| D614,560 S | * | 4/2010 | Alexander | D12/345 |
| 2008/0279688 A1 | * | 11/2008 | Jensen et al. | 416/95 |

* cited by examiner

*Primary Examiner* — Tien Dinh
*Assistant Examiner* — Justin Benedik
(74) *Attorney, Agent, or Firm* — Buskop Law Group, PC; Wendy Buskop

(57) ABSTRACT

A bird collision prevention device with a plurality of circular interior support members with decreasing diameters concentrically disposed along an axis, a plurality of outer ribs welded tangentially to the circular interior support members forming a like conical shape mesh body, a plurality of bolts or latches securable to the circular interior support member with the largest diameter and the cowling, and wherein the mesh body is secured to the cowling of the turbine engine enabling a tapered end of the mesh body to extend away from the turbine engine.

22 Claims, 6 Drawing Sheets

BIRD COLLISION PREVENTION DEVICE FOR AN AIRCRAFT

FIELD

The present embodiments generally relate to a mesh device to prevent foreign objects, such as a bird, wildlife or debris from penetrating a turbine engine of an aircraft.

BACKGROUND

A need exists to prevent bats and birds, debris or any intentionally thrown object from entering jet aircraft engines during takeoff and while passing a flock of birds during flight.

A further need exists for providing a device that protects a jet aircraft engine from wildlife penetration while offering an ability to de-ice the wildlife protection device.

A need exists for a protection device to stop deliberate acts of terrorism which could involve flying model aircraft in the vicinity of airplanes about to take off, or launching any foreign matter or metal at aircraft as it is taking off.

The present embodiments meet these needs.

BRIEF DESCRIPTION OF THE DRAWINGS

The detailed description will be better understood in conjunction with the accompanying drawings as follows.

Figure 1:
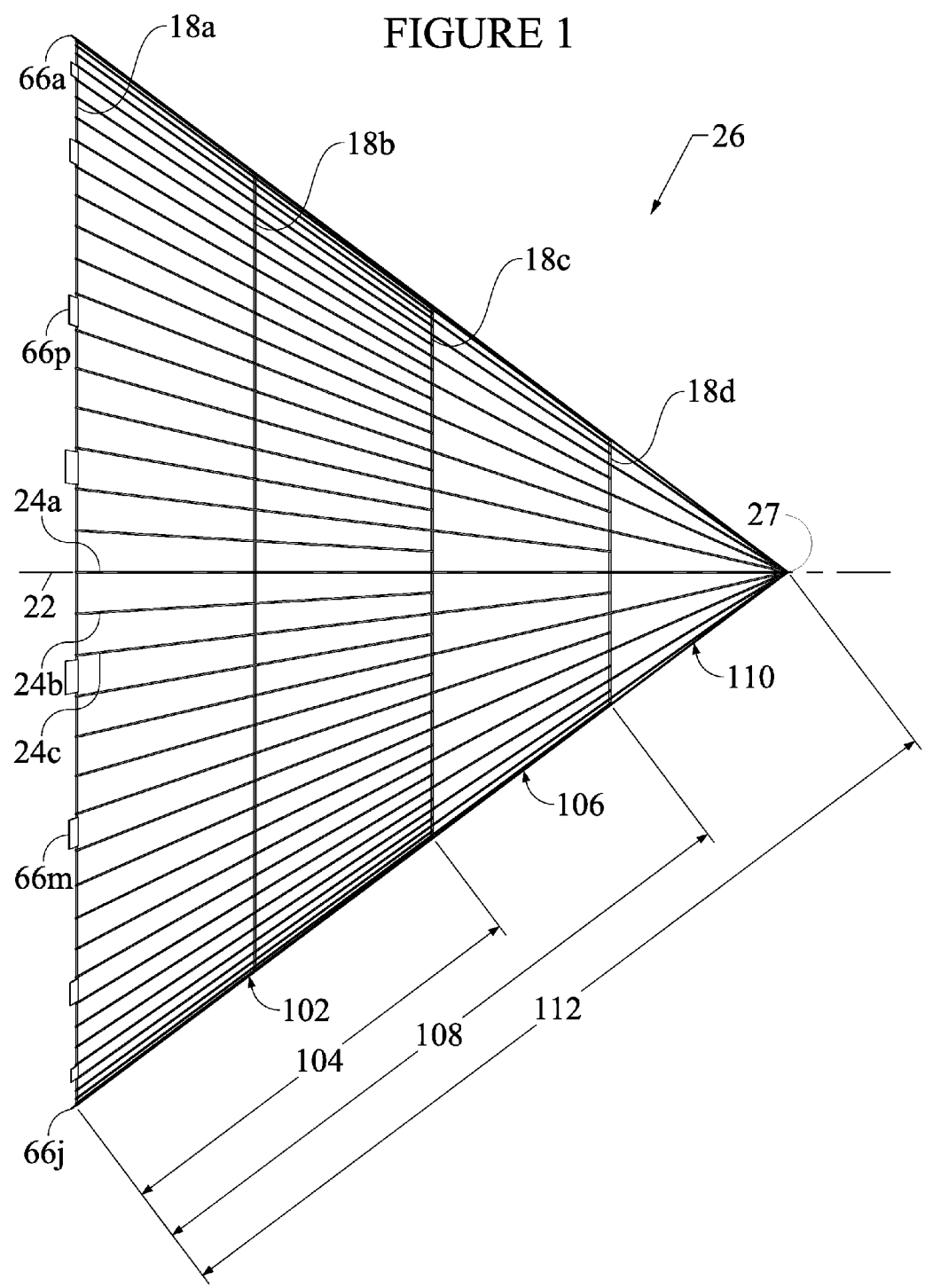
FIG. 1 is a side view of the circular interior support members with the outer ribs forming the mesh body.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a bird collision prevention device securable to a cowling of a turbine engine of an aircraft. The device is essentially a unique lightweight mesh body, such as a mesh cone body, rigidly yet flexibly made to handle aircraft vibration and successful deflection of foreign objects such as birds, bats, cloth, pieces of metal, or other wildlife.

Birds entering turbine engine cowlings recently caused a U.S. Airways Airbus jet aircraft with turbine engines to crash into the Hudson River of New York. Although all passengers were safely deplaned, it could have been a disaster. This invention is designed to prevent these types of crashes.

Large geese wintering at La Guardia airport in New York took off as the US Airways Airbus jet was lifting off, and at least one was sucked into the turbine engine of the aircraft, causing it to either stop or explode, current reports do not reveal which event actually occurred.

A need has long existed to prevent aircraft crashes due to bats, geese, ducks and other flying matter entering the turbine engines.

Terrorism has become a concern for aircraft, and given that air launchers have been developed to hurl pumpkins hundreds of feet in annual contests, it is conceivable that a terrorist could hurl cloth, metal, or other vegetable matter like pumpkins, from the ground near aircraft lifting off for terrorism purposes. It is also contemplated that radio controlled aircraft toys (or models used by hobbyists) can be navigated from the ground into the general lift-off area of the aircraft.

The present invention can prevent wild life accidents and possible incidents of vegetable matter, metallic objects or fiber hurling at aircraft during take-off, and prevent such accidents.

The bird collision prevention device can be made up of a plurality of circular interior support members each having a sequentially decreasing diameter concentrically disposed along an axis. The circular interior support members can be defined herein to include circular shapes, ellipsoid shapes or other geometric shapes, following the actual shape of the cowling.

The circular interior support members can be tubular.

The circular interior support members can be solid metal or hollow tubes or at least partially hollow tubes. In an embodiment, the circular interior members can have a group of members that are hollow and a group that are solid, or a group that are partially hollow or combinations thereof.

In an embodiment, wherein the circular interior support members are at least hollow tubes, it can be contemplated that the hollow tubes can hold wires that create a current, or heat, and act as at least one heater. If wires are placed into the tubes, the wires can be connected to a power source to melt ice that is built up on the bird collision prevention device.

The circular interior support members can be elliptical in shape, a shape identical to the cowling, or another geometric shape around the turbine engine.

The circular interior support members can be made from metal, such as stainless steel, graphite composites, fiberglass, reinforced plastics or combinations thereof.

In an embodiment, it can be contemplated that the circular interior support members can be made from a core of a first material, that can be rigid such as steel, or having a first property and an encapsulation material over the core which can be a second material, such as a partial elastomeric material or other impact resistant material.

The circular interior support members can be made from a material that can be tubular or can be flat matter with an outer diameter of about ¼ inch to about ½ inch diameter or if flat metal, a thickness of about ¼ inch to about ½ inch.

The circular interior support members can be a round shaped flat metal. The circular interior support members can further be molded members.

Each circular interior support member can form a circular object or shape that can have an overall shape diameter of at least about 20 percent up to about 50 percent, less than an adjacent circular interior support member. The overall shape diameters can differ between about 20 percent to about 30 percent, so long as the adjacent circular interior support member is smaller than the circular interior support member adjacent to it and all circular interior support members can be sequentially oriented along an axis.

In an embodiment, circular interior support members can be oriented to form a structure that causes birds or other foreign objects to slide away from the engine, and for a conical shape, the length of the formed structure can be equal to the diameter of the largest circular interior support member divided by approximately 1.5

For example, a first circular interior support member can have a diameter of about 60 inches, the second circular interior support member adjacent the first circular interior support member can have a diameter of about 45 inches, the third circular interior support member adjacent the second circular interior support member can have a diameter of about 30 inches, and the fourth circular interior support member adjacent to the third circular interior support member can have a diameter of about 15 inches.

In an embodiment, between about 2 circular interior support members to about 8 circular interior support members can be used.

All circular interior support members can be sequentially oriented to have as their central axis, an axis in common.

An embodiment can contemplate that the diameter of the circular interior support member with the largest diameter can be between about 40 inches to about 120 inches, depending on the gas turbine model.

An embodiment can contemplate at half the length of the mesh body three diametrical struts can be welded to the mid circular interior support member. Struts can be made of ½ inch hollow material to allow electric heaters in their interior.

Secured to all of the circular interior support members can be a plurality of outer ribs.

Each outer rib can be contemplated to be welded to all of the sequentially disposed circular interior support members. As an example, the welding can be by arc welding or spot welding. Arc welding can be usable in aircraft devices because it is a lighter-in-weight form of welding.

An embodiment can contemplate that the outer ribs are of a length that extends between each of the circular interior support members, each length can be identical or different but the connection is between adjacent circular interior support members.

In another embodiment, the outer ribs can have a plurality of lengths. A first group of outer ribs can have a first length that can engage between the largest circular interior support member over the adjacent circular interior support member, referred to as the second circular interior support member, to the circular interior support member which is adjacent the second circular interior support member as is termed herein as the third circular interior support member.

A second group of outer ribs can engage between the third circular interior support member and a fourth interior circular support member, having a second length and a third group of outer ribs which can engage between the fourth interior circular support member and a consolidated end, that forms what is referred to herein as "the tapered end" and this third group has a third length.

For very large aircraft or very small aircraft, the quantity of these groups of outer ribs can vary and the lengths of these groups of outer ribs can vary.

In the embodiment, the first length can be half the length of the mesh body, the second length can be about ¾ of the length of the mesh body, and the third length can be about entire of the length of the mesh body.

In an embodiment of the invention using different lengths of outer ribs, it can be contemplated that the first group of outer ribs can be offset in alignment with at least a portion of the second group of outer ribs, and the third group of outer ribs can be offset in alignment with at least a portion of the second group of outer ribs.

In embodiment, the first group of outer ribs are not aligned with the second group of outer ribs. It can be contemplated that the second group of outer ribs can be staggered at least about 30 percent from alignment with the first group of outer ribs. It can also be contemplated that the third group of outer ribs can be staggered again at least about 30 percent from the second group of outer ribs.

As an example, when the first circular interior support member has a diameter of about 60 inches, then the first group of outer ribs can be about 25.5 inches in length, the second group of outer ribs can be about 12.75 inches in length and the third group of outer ribs can be about 12.75 inches in length.

In another embodiment, outer ribs can also have three lengths as follows, the first length is from the largest circular interior support member to the third circular interior support member, the second length is from the largest circular interior support member to the fourth circular interior support member and the third length is from the largest circular interior support member to the consolidated end.

In an embodiment, the outer ribs can be solid metal. Outer ribs closest to the tapered end can be hollow to allow for heating wires connected to the airplane power source or the turbine engine power source can be inserted for a simultaneous dual acting bird collision prevention device and de-icing device.

The outer ribs can be tangentially oriented to the plurality of circular interior support members disposed sequentially along the axis and together, the outer ribs can be secured to circular interior support members and can form a conical like mesh body with a tapered end.

In an embodiment, it can be contemplated that between about 150 outer ribs to about 300 outer ribs can be in three groups. It can be further contemplated that these outer ribs can be disposed equidistantly around the axis along the circular interior support members. The outer ribs can all be oriented in the same direction, aiming to the tapered end. In an embodiment, between about 80 outer ribs to about 180 outer ribs can be in the first group, between about 50 to about 100 outer ribs can be in the second group, and about 30 outer ribs to about 60 outer ribs can be in the third group and mergers to the tapered end.

The outer ribs can be made from the same material as the circular interior support members or they can be made from different material.

In one example, 160 outer ribs can be used as a first group and each outer rib can be about 25.5 inches long in this first group, 80 outer ribs can be used for a second group wherein each outer rib can be about 12.75 inches long, and about 40 outer ribs can be used as a third group and each outer rib can be about 12.75 inches long. All of these outer ribs can have the same thickness of about ¼ inch to ½ inch, but some outer ribs in this embodiment can be hollow and some can be solid. The hollow outer ribs can be those furthest from the engine the solid ones can be those closest to the engine.

The outer ribs can be perforated in part for lightness during flight and economy of fuel consumption.

The outer ribs can be partially hollow or solid having an outer diameter between about ¼ inch to about ½ inch.

In an embodiment it can be contemplated that a heater can be inserted into the hollow portion of the outer ribs. The outer ribs can only be hollow at the tapered end, allowing simultaneous de-icing as well as anti-fowling (of birds) with the device. With the heater, the tapered end can then be heated effectively preventing ice build up.

The outer ribs can be coated with an antistatic coating such as those made by Akzo Nobel Aerospace Coatings or antistatic material to resist ionic charge buildup between the bird collision prevention device and the cowling of the aircraft turbine engine.

The outer ribs can be made of steel, graphite composite, reinforced fiberglass or combinations thereof.

A portion of the outer ribs can be made of a material that differs from a portion of the circular interior support members.

In an embodiment, stainless steel welded wire mesh of about 1½ inches by about 1½ inches can be used instead of the outer ribs. The wire diameter can be about 3/16 inches. In this case, the wire mesh can be wrapped over the circular interior support members, forming a conical shape. All circular interior support members can be about ½ inch tubular material to allow electric heaters in their interior. In this embodiment, reinforcement diametrical struts can be used, in the middle of the length of the conical shape device, welded to the middle interior support member. Reinforcement struts can be made of same ½ inch hollow material to allow electric heaters in their interior.

The bird collision prevention device can be securable to the cowling of the turbine of an aircraft with a plurality of attaching means.

In an embodiment, the attaching means can be a one piece "installed in the tab" bolt with a lock washer and can be secured through a plurality of mounting tabs, which can be affixed or removably secured to the cowling. This design can allow the bolts to be tightened with a pneumatic device for ease of installation and removal without any portion of the attaching means falling into the engine.

In another embodiment, the attaching means can be a plurality of unique one piece fasteners that can prevent any portion falling into the turbine engines. The attaching means in this embodiment can also be secured through a plurality of mounting tabs, which can be affixed or removably secured to the cowling.

In still another embodiment, the attaching means can include a mounting ring with a plurality of "installed in the ring" bolts and lock washers, with about 24 bolts, such as 6 bolts per quadrant of the mounting ring. This design can allow the bolts to be tightened with a pneumatic device for ease of installation and removal without any portion of the attaching means falling into the engine.

In an embodiment, the attaching means can be contemplated to be a two part attaching means, such as latches. The two part attaching means can have a cowling portion that can attach to the cowling of the aircraft and a mesh body portion that can attach to the circular interior support member with the largest diameter. Examples of a two part attaching means of these types can be those available from Aircraft Spruce & Specialty Co. model Hartwell Latch H-5000-2.

Other two part attaching means can be used herein. It can be further contemplated that latches without spring loading can be used and can enable the device to be completely removable from the cowling which can be useful for cleaning, engine maintenance, or painting.

In an embodiment, it can be contemplated that between about 12 latches to about 36 latches can be used to hold the bird collision prevention device to the cowling.

To enable routine cleaning of the bird collision prevention device or to routinely service the turbines, it can be contemplated that two pistons can be used to raise the bird collision protection device from a closed position over the turbine to an open position, leaving the front of the turbine completely accessible for maintenance, inspection, or other activities needed by the aircraft owner.

A first piston and a second piston can each have a first piston end that can be securable to the cowling and a second piston end that can be securable to the circular interior support member with the largest diameter.

The pistons can be hydraulic pistons, such as those made by PRINCE model number PMC-5408 or can be pneumatic pistons such as those made by SPEEDAIRE, model 3ATD7.

The pistons can be between about 12 inches to about 40 inches long.

In addition to the two pistons, a connection can be used to hold the bird collision prevention device to the cowling. The connection can be positioned between the first and second pistons. The connection can have a first connection end engaging the cowling and a second connection end engaging the circular interior support member with the largest diameter.

An embodiment can contemplate that the pistons can be remotely actuated, such as from the cockpit.

The mesh body can be secured to the cowling of the turbine engine with the connection and pistons that can enable the mesh body to lift away from the turbine. The mesh body can have a locking device, that can also be remotely actuated. The mesh body can be oriented so that the tapered end extends away from the turbine engine, the tapered end can push the birds or other foreign objects away from the turbine, so the engine does not stop operating.

The connection can be a hinge in an embodiment. The hinge and pistons can be mounted to a top section of the circular interior support member with the largest diameter.

In an embodiment, a cap can be positioned over the tapered end.

The cap can have a diameter between about 1 inch to about 1.5 inches and can be conical in shape for securing to the tapered end.

In still another embodiment, the bird collision prevention device can have at least one sensor connected to the mesh body. The long range sensor can be one such as a Senix® Toughsonic® that can be capable of providing an alarm when a foreign object proximates or connects with the mesh body.

It can be contemplated that in yet another embodiment, a sensor can be used that detects a bird within about ¼ mile of the aircraft and can actuate at least one light mounted to the cowling An example of a usable light for scaring the birds away can be one such as Bird Strobe Light made by Bird-X that can connect to the aircraft power supply.

It can be contemplated that the mesh cone of the bird collision prevention device can be completely removed from the cowling for ease of replacement.

Turning now to the Figures, FIG. 1 is a side view of the circular interior support members 18a, 18b, 18c, 18d with the outer ribs 24a-24oo forming the mesh body 26. Each of the circular interior support members can be disposed and oriented, so that each ring has the same center point, such as axis 22.

The outer ribs 24a-24oo are shown and can be welded to the outer sides of the circular interior support members 18a, 18b, 18c, 18d and can be oriented to taper toward the tapered end 27.

It should be noted in FIG. 1 that a first group of outer ribs 102 are shown with a first length 104 that are offset from a second group of outer ribs 106 with a second length 108 and a third group of outer ribs 110 with a third length 112.

FIG. 1, further shows mounting tabs 66j-66a, which will be described in more detail.

Figure 2:
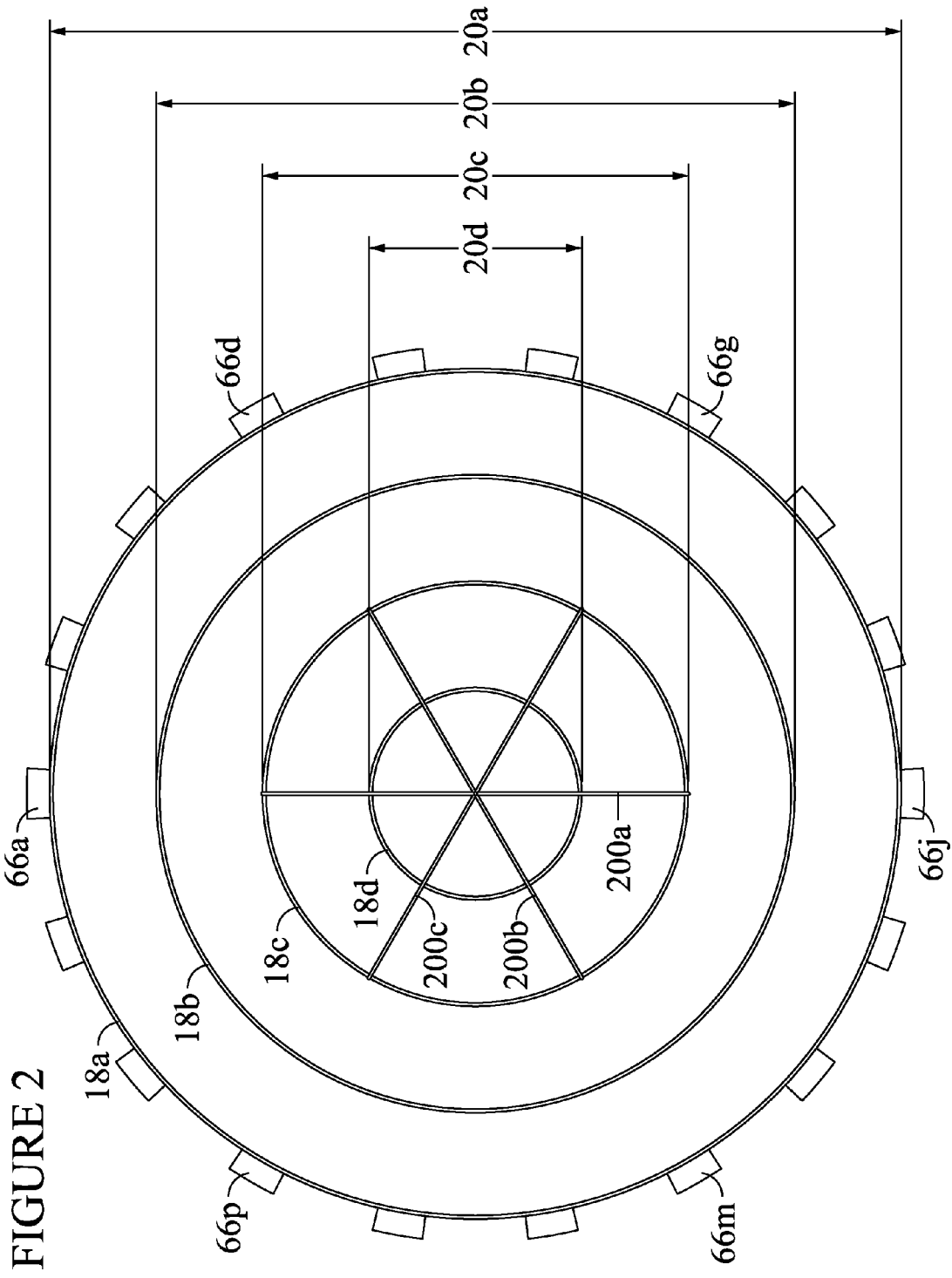
FIG. 2 depicts a front view of FIG. 1 without the outer ribs and shows three diametrical struts.

FIG. 2 is a front view of the circular interior support members 18a, 18b, 18c, 18d. The first circular interior support member 18a can have a diameter 20a that is larger than the diameter 20b of the second circular interior support member 18b. Additional diameters are shown for additional circular interior support members decreasing in size as diameters 20c, 20d.

FIG. 2 further shows three diametrical struts 200a, 200b and 200c, at 18c that can be used to reinforce the wire mesh body.

Figure 3:
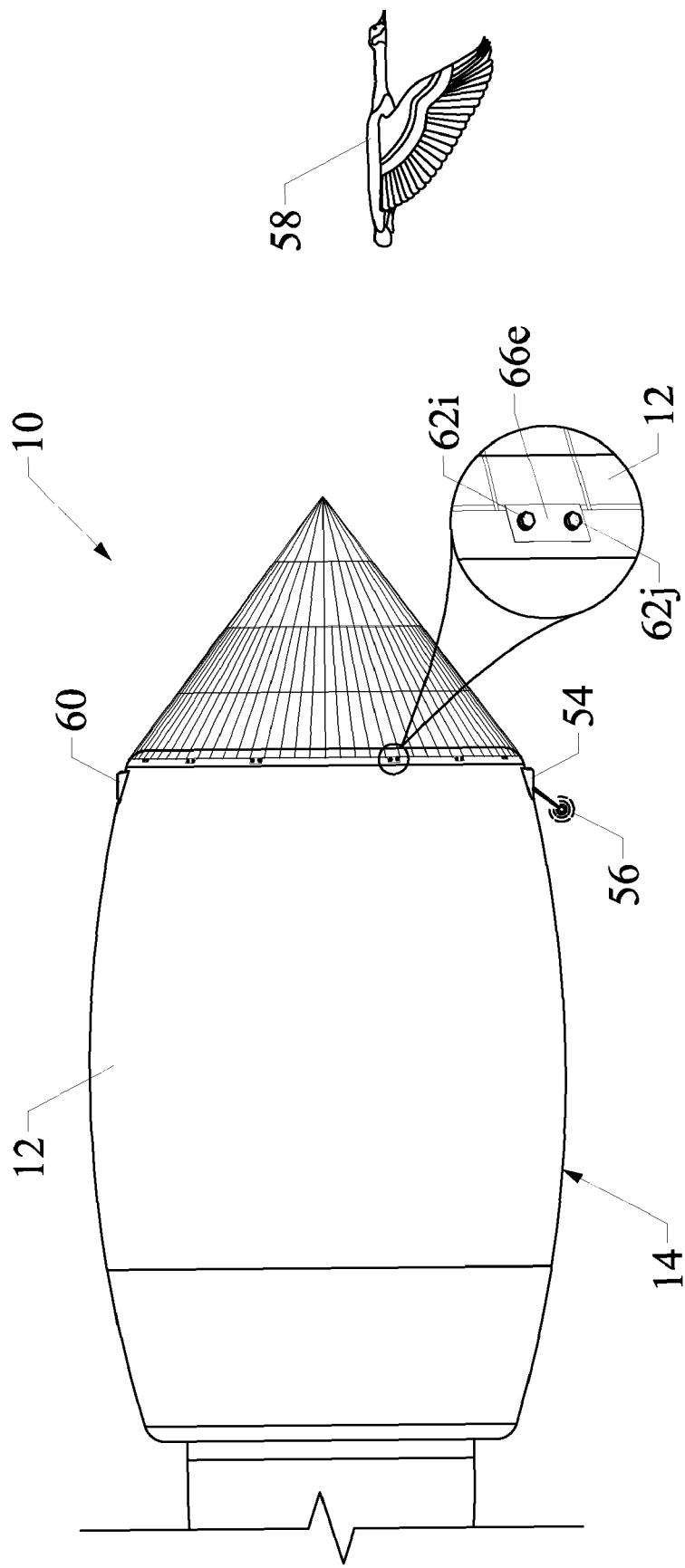
FIG. 3 depicts the cowling of the turbine with the mesh body forming the bird collision prevention device.

FIG. 3 shows a bird collision prevention device 10 with a cowling 12 and a turbine engine 14. Secured to the cowling can be a plurality of attaching means 62a-62p, which can be equidistantly disposed around the cowling 12 and the circular interior support member. The attaching means can be a one piece or two piece unit.

FIG. 3 also shows a detail of the attaching means 62i, 62j, which are shown mounted to the cowling 12 through mounting tab 66e.

FIG. 3 further shows sensor 54 can be secured to the cowling 12, also be can be oriented toward the tapered end and can be used for sensing a foreign object 58, which can be a goose.

The sensor 54 can transmit, such as wirelessly an alarm signal 56 to a receiver which can be located in the cockpit of the aircraft. The sensor 54 can also actuate a light 60, which can be attached to the cowling to light up when a foreign object is about ¼ mile away from the aircraft, and the foreign object, such as a bird or wildlife's life can be saved.

Figure 4:
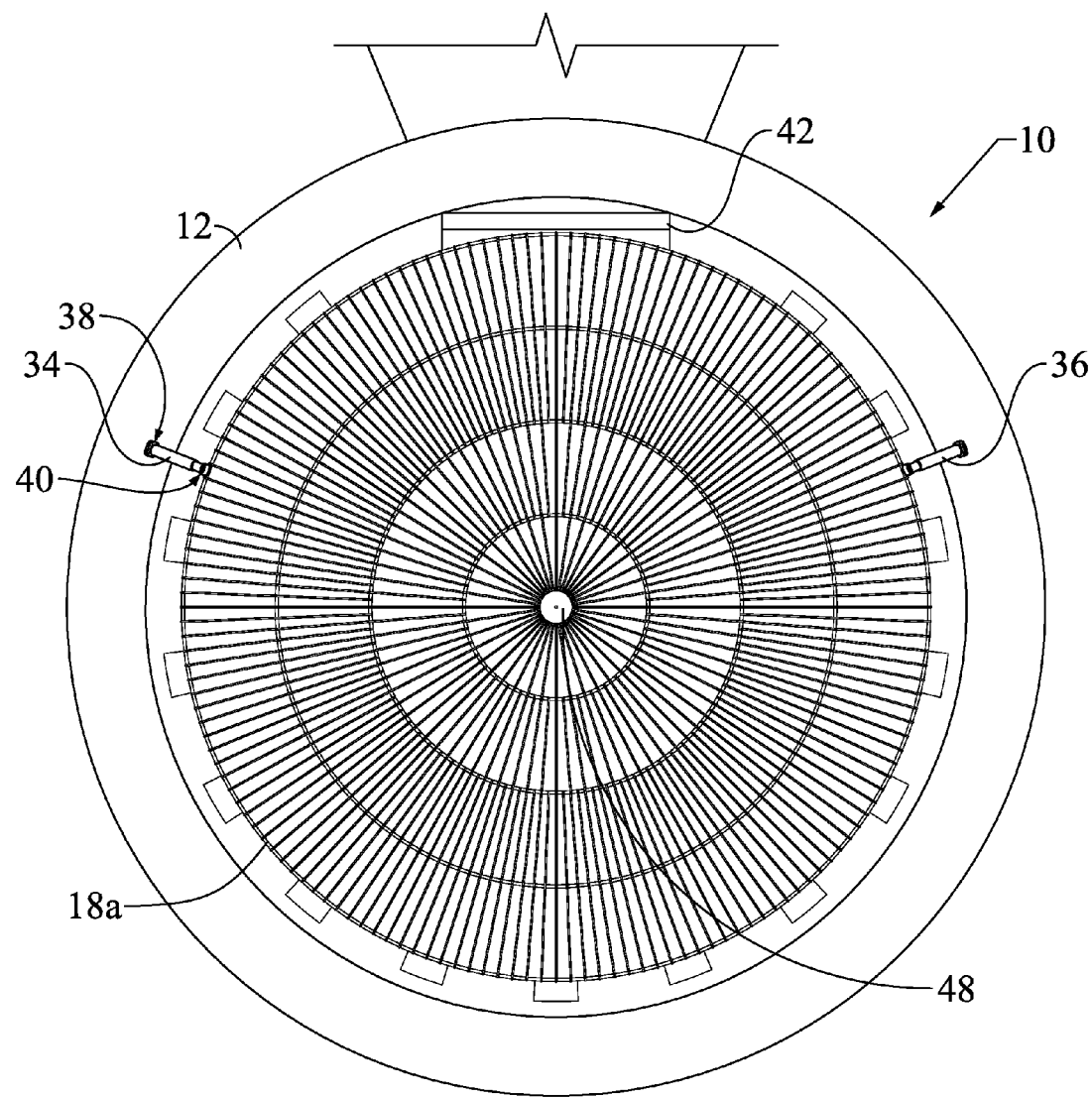
FIG. 4 depicts a front view of the device showing the pistons and hinge for holding the bird collision prevention device affixed to the cowling.

FIG. 4 shows the front view of the bird collision prevention device 10, wherein the mesh body can be secured to the cowling 12 using two pistons 34, 36 and a connection 42, which can be a hinge, as shown in this Figure.

FIG. 4 further shows the largest of the circular interior support members 18a, which can have a first piston 34 and second piston 36, shown here at approximately a 10 o'clock position and approximately a 2 o'clock position. The first piston 34 can have a first piston end 38 that attaches to the cowling and the first piston can have a second piston end 40 that attaches to the largest of the circular interior support members 18a.

A connection 42, is depicted at approximately a 12 o'clock position, which can further be positioned between the two pistons. The connection 42 can have a first connection end that connects to the cowling 12 and a second connection end that engages the largest of the circular interior support members 18a.

Figure 5:
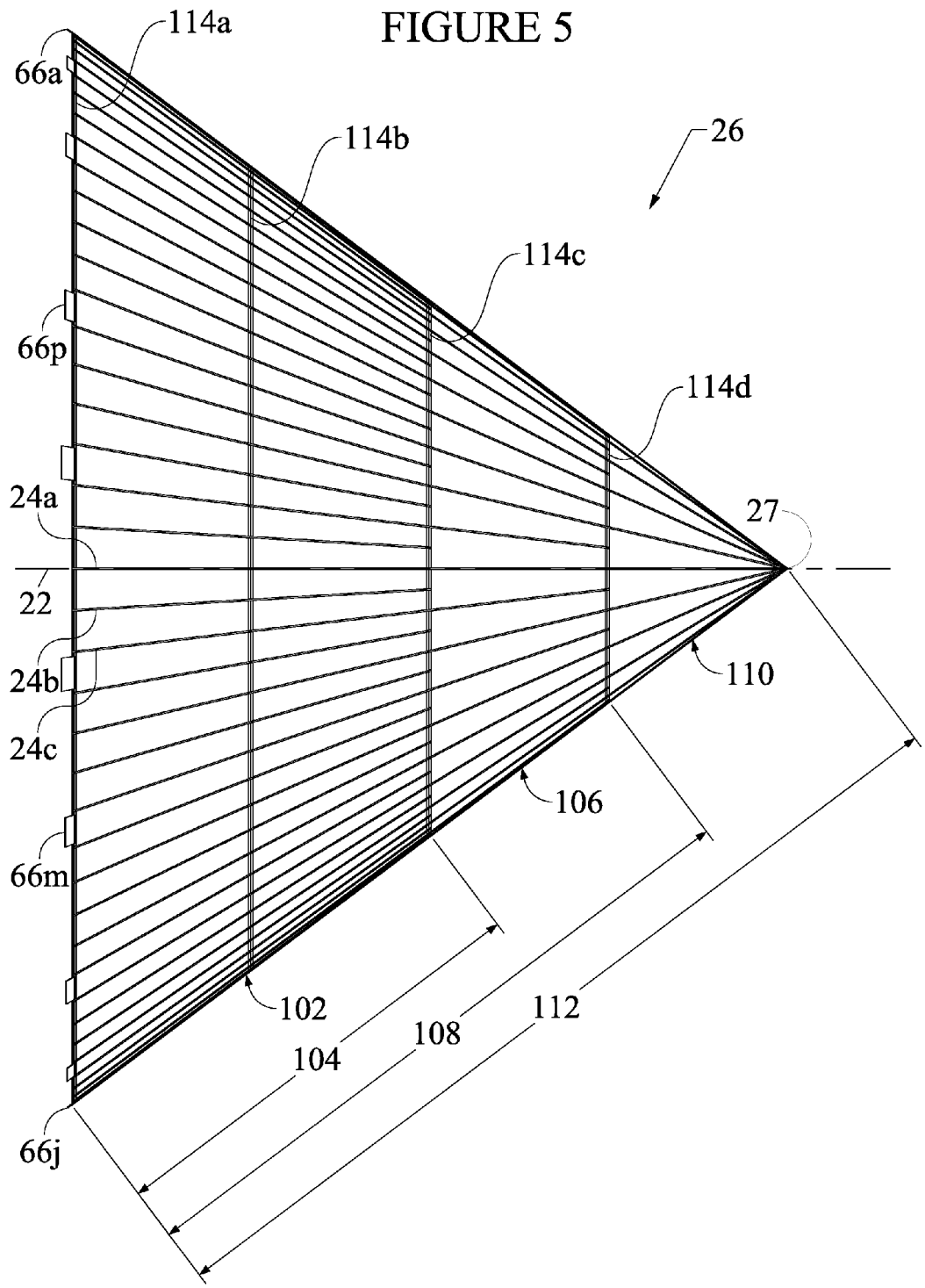
FIG. 5 depicts a different side view with the at least one set of two parallel circular interior support members welded together.

FIG. 5 depicts the bird collision prevention device, as shown in FIG. 1, but can further have at least one set of two parallel circular interior support members welded together, at positions 114a, 114b, 114c, 114d. For each set of two parallel circular interior support members welded together at 114a, 114b, 114c, 114d, the first circular interior support member of the at least one set of two parallel circular interior support members can have a diameter slightly larger than the second circular interior support member welded to it.

Figure 6A:
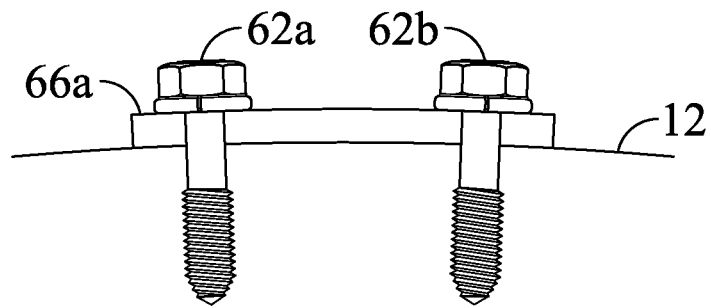
FIGS. 6A and 6B show embodiments of the attaching means for securing the mesh body to the cowling.
Figure 6B:
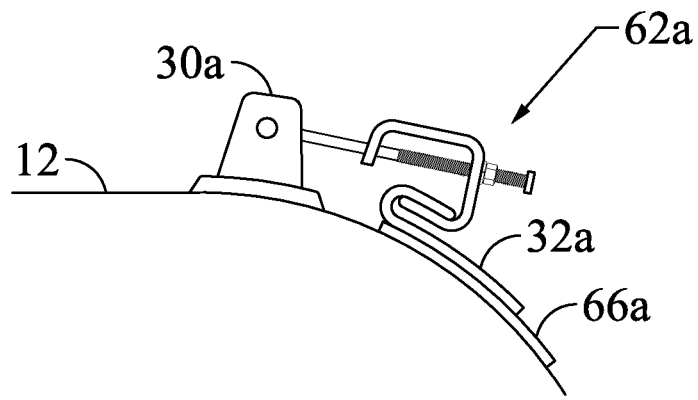

FIG. 6A and FIG. 6B show alternative embodiments of the attaching means 62a, 62b. FIG. 6A shows the attaching means 62a, 62b can be bolts, which can be mounted through the mounting tab 66a for securing the mesh body to the cowling 12. FIG. 6B shows the attaching means 62 can be a latch, which can have a cowling portion 30a and a mesh body portion 32a, which can be mounted through the mounting tab 66a for securing the mesh body to the cowling 12.

Figure 7:
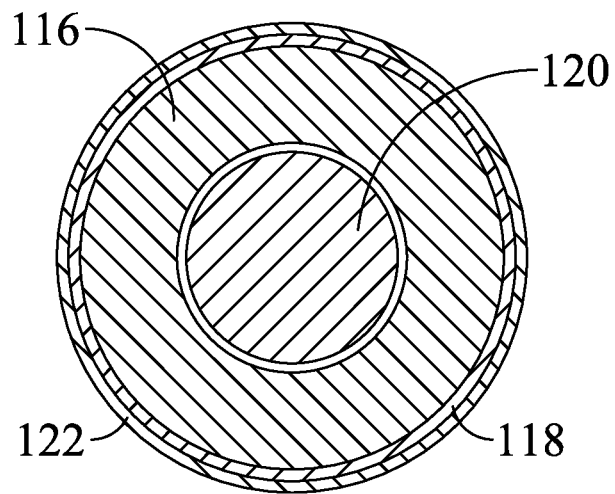
FIG. 7 is cross sectional view of an outer rib usable herein.

FIG. 7 is a cross section of an embodiment of the invention showing an outer rib or a circular interior support member with a reinforced core 116, which can be covered with a an impact resistant material 118 with a wire disposed through the reinforced core as a heater 120. Additionally, antistatic coating 122 can be used.

It can be contemplated that the bird collision prevention device can be used on wind tower turbines to prevent birds, bats, wildlife and debris from damaging the wind tower, which are also known in the art as "windmills."

While these embodiments have been described with emphasis on the embodiments, it should be understood that within the scope of the appended claims, the embodiments might be practiced other than as specifically described herein.

What is claimed is:

1. A bird collision prevention device securable to a cowling of a turbine engine of an aircraft, comprising:
   a. a plurality of circular interior support members each having a sequentially decreasing diameter concentrically disposed along an axis, and wherein each circular interior support member has a diameter at least 20 percent and up to 50 percent smaller than a prior circular interior support member, and wherein the plurality of circular interior support members are sequentially oriented along the axis;
   b. a plurality of outer ribs, wherein each outer rib is welded tangentially to the plurality of circular interior support members disposed sequentially along the axis forming a conical shape mesh body with a tapered end; and
   c. a plurality of attaching means, wherein the mesh body is secured to the cowling of the turbine engine using the attaching means and enabling the tapered end to extend away from the turbine engine and prevent at least one foreign object from entering the turbine engine;
   the bird collision prevention device further comprising a first piston and a second piston each connected on a first piston end to the cowling and on a second piston end to the circular interior support member with the largest diameter; and a connection disposed between the first and second pistons having a first connection end engaging the cowling and a second connection end engaging the circular interior support member with the largest diameter.

2. The bird collision prevention device of claim 1, further comprising a cap disposed over the taper end for reinforcing the outer ribs ends.

3. The bird collision prevention device of claim 1, wherein the plurality of attaching means comprises a plurality of bolts or latches, wherein each attaching means comprise:
   a. a cowling portion securable through a plurality mounting tabs to the cowling; and
   b. a mesh body portion securable through a plurality of mounting tabs to the circular interior support member with the largest diameter.

4. The bird collision prevention device of claim 1, wherein the pistons are hydraulic, pneumatic, mechanical, or combinations thereof.

5. The bird collision prevention device of claim 1, wherein the outer ribs comprise a first group of outer ribs having a first length that engage between the largest circular interior support member over a second circular interior support member and a third circular interior support member, a second group of outer ribs engaging between the largest circular interior support member and a fourth interior circular support member having a second length, and a third group of outer ribs engaging between the largest interior circular support member and the tapered end, having a third length.

6. The bird collision prevention device of claim 5, wherein the first group of outer ribs are offset in alignment with at least a portion of the second group of outer ribs, and the third group of outer ribs are offset in alignment with at least a portion of the second group of outer ribs.

7. The bird collision prevention device of claim 1, further comprising at least one sensor connected to the mesh body.

8. The bird collision prevention device of claim 7, wherein the at least one sensor provides an alarm when the foreign object proximates the mesh body.

9. The bird collision prevention device of claim 7, wherein the at least one sensor detects a foreign object within ¼ mile of the aircraft, and actuates at least one light mounted to the cowling.

10. The bird collision prevention device of claim 1, wherein the diameter of the circular interior support member with the largest diameter is between 40 inches to 120 inches.

11. The bird collision prevention device of claim 1, wherein between 4 circular interior support members to 8 circular interior support members are used to form the mesh body.

12. The bird collision prevention device of claim 1, wherein at least one of the circular interior support members comprises two parallel circular interior support members welded together, wherein a first of the two parallel circular interior support members has a diameter slightly larger than the second of the two parallel circular interior support members.

13. The bird collision prevention device of claim 1, wherein between 150 outer ribs to 300 outer ribs are used to form the like conical shape mesh body.

14. The bird collision prevention device of claim 1, wherein the circular interior support members and the outer ribs comprise steel, graphite composite, reinforced fiberglass reinforced plastics or combinations thereof.

15. The bird collision prevention device of claim 14, wherein a portion of the circular interior support members are made from a different material than a portion of the outer ribs.

16. The bird collision prevention device of claim 1, wherein the circular interior support members and the outer ribs comprise a reinforced core encapsulated with an impact resistant material.

17. The bird collision prevention device of claim 1, wherein at least a portion of the circular interior support members and at least a portion of the outer ribs are hollow.

18. The bird collision prevention device of claim 1, wherein the mesh cone can be completely removed from the cowling.

19. The bird collision prevention device of claim 1, further comprising at least one heater disposed in at least one of the outer ribs, at least one of the circular interior support members, or combinations thereof.

20. The bird collision prevention device of claim 1, wherein the circular interior support members are elliptical in shape, a shape identical to the cowling, or another geometric shape.

21. The bird collision prevention device of claim 1, further comprising an antistatic coating to resist ionic charge buildup between the bird collision prevention device and the cowling of the aircraft turbine engine.

22. The bird collision prevention device of claim 1, further comprising three diametrical reinforcing struts disposed on one of the plurality of interior support members.

* * * * *